United States Patent
Amaitis et al.

(10) Patent No.: US 11,341,821 B2
(45) Date of Patent: *May 24, 2022

(54) METHOD AND APPARATUS FOR PROVIDING ADVICE REGARDING GAMING STRATEGIES

(71) Applicant: CANTOR INDEX LLC, New York, NY (US)

(72) Inventors: Lee M. Amaitis, Las Vegas, NV (US); Joseph M. Asher, Las Vegas, NV (US); James C. Johnson, Cresskill, NJ (US)

(73) Assignee: CANTOR INDEX LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,703

(22) Filed: Sep. 14, 2020

(65) Prior Publication Data

US 2020/0410823 A1    Dec. 31, 2020

Related U.S. Application Data

(63) Continuation of application No. 16/149,610, filed on Oct. 2, 2018, now Pat. No. 10,777,046, which is a
(Continued)

(51) Int. Cl.
*G07F 17/32* (2006.01)
*A63F 13/80* (2014.01)
(Continued)

(52) U.S. Cl.
CPC ............ *G07F 17/3293* (2013.01); *A63F 1/06* (2013.01); *A63F 1/18* (2013.01); *A63F 13/55* (2014.09);
(Continued)

(58) Field of Classification Search
None
See application file for complete search history.

(56) References Cited

U.S. PATENT DOCUMENTS

| | | |
|---|---|---|
| 3,689,071 A | 9/1972 | Kucera |
| 3,909,002 A | 9/1975 | Levy |

(Continued)

FOREIGN PATENT DOCUMENTS

| | | |
|---|---|---|
| EP | 0850673 | 7/1998 |
| EP | 1 319 428 | 6/2003 |

(Continued)

OTHER PUBLICATIONS

U.S. Appl. No. 60/339,914, Dec. 12, 2001, Lutnick.
(Continued)

*Primary Examiner* — Ronald Laneau

(57) ABSTRACT

Methods for providing gaming advice are provided. For example, regarding a blackjack game, one or more first player cards are identified for a first player and one or more second player cards are identified for a second player. The first and second player cards are displayed to the first player. A probability associated with a first one of the plurality of playing options is determined based at least on a set of predetermined statistical blackjack data, the one or more first player cards, and the one or more second player cards. It is then determined, based at least on the determined probability associated with the first playing option, whether to display a first indication corresponding with first advice regarding the first playing option, a second indication corresponding with second advice regarding the first playing option, or a third indication corresponding with third advice regarding the first playing option.

19 Claims, 5 Drawing Sheets

Related U.S. Application Data continuation of application No. 15/390,018, filed on Dec. 23, 2016, now Pat. No. 10,096,210, which is a continuation of application No. 14/279,779, filed on May 16, 2014, now Pat. No. 9,536,396, which is a continuation of application No. 13/481,096, filed on May 25, 2012, now Pat. No. 8,727,352, which is a continuation of application No. 12/249,249, filed on Oct. 10, 2008, now Pat. No. 8,186,682, which is a continuation of application No. 11/032,724, filed on Jan. 10, 2005, now Pat. No. 7,452,273.

(51) Int. Cl.
  *A63F 13/55* (2014.01)
  *A63F 1/06* (2006.01)
  *A63F 1/18* (2006.01)

(52) U.S. Cl.
  CPC .............. *A63F 13/80* (2014.09); *G07F 17/32* (2013.01); *G07F 17/323* (2013.01); *G07F 17/3227* (2013.01); *G07F 17/3258* (2013.01); *G07F 17/3276* (2013.01)

(56) References Cited

U.S. PATENT DOCUMENTS

| | | |
|---|---|---|
| 3,962,800 A | 6/1976 | Feldheim |
| 4,014,549 A | 3/1977 | Cywar |
| 4,052,073 A | 10/1977 | Miller |
| 5,100,326 A | 3/1992 | Leep et al. |
| 5,127,651 A | 7/1992 | Okada |
| 5,265,009 A | 11/1993 | Colavita |
| 5,297,802 A | 3/1994 | Pocock et al. |
| 5,324,035 A | 6/1994 | Morris et al. |
| 5,333,868 A | 8/1994 | Goldfarb |
| 5,432,932 A | 7/1995 | Chen et al. |
| 5,507,485 A | 4/1996 | Fisher |
| 5,573,249 A | 11/1996 | Johnson |
| 5,628,511 A | 5/1997 | Jacoby |
| 5,630,753 A | 5/1997 | Fuchs |
| 5,702,303 A | 12/1997 | Takemoto et al. |
| 5,779,546 A | 7/1998 | Meissner et al. |
| 5,816,918 A | 10/1998 | Kelly et al. |
| 5,893,064 A | 4/1999 | Kudirka et al. |
| 5,895,048 A | 4/1999 | Smith, Jr. |
| 5,910,048 A | 6/1999 | Feinberg |
| 6,003,013 A | 12/1999 | Boushy et al. |
| 6,007,426 A | 12/1999 | Kelly et al. |
| 6,062,979 A | 5/2000 | Inoue |
| 6,068,552 A | 5/2000 | Walker et al. |
| 6,113,102 A | 9/2000 | Marks et al. |
| 6,131,906 A | 10/2000 | Green |
| 6,267,671 B1 | 7/2001 | Hogan |
| 6,273,820 B1 | 8/2001 | Haste, III |
| 6,293,866 B1 | 9/2001 | Walker et al. |
| 6,302,793 B1 | 10/2001 | Fertitta et al. |
| 6,315,662 B1 | 11/2001 | Jorasch et al. |
| 6,319,125 B1 | 11/2001 | Acres |
| 6,409,602 B1 | 6/2002 | Wiltshire et al. |
| 6,485,367 B1 | 11/2002 | Joshi |
| 6,508,709 B1 | 1/2003 | Karmarkar |
| 6,605,003 B2 | 8/2003 | Suchocki et al. |
| 6,634,942 B2 | 10/2003 | Walker et al. |
| 6,651,985 B2 | 11/2003 | Sines et al. |
| 6,679,497 B2 | 1/2004 | Walker et al. |
| 6,682,421 B1 | 1/2004 | Rowe et al. |
| 6,726,427 B2 | 4/2004 | Jarvis et al. |
| 6,793,575 B2 | 9/2004 | Brown et al. |
| 6,852,030 B2 | 2/2005 | Baerlocher et al. |
| 6,966,832 B2 | 11/2005 | Leen et al. |
| 6,991,544 B2 | 1/2006 | Soltys et al. |
| 7,008,320 B2 | 3/2006 | Rowe et al. |
| 7,029,394 B2 | 4/2006 | Leen et al. |
| 7,175,179 B2 | 2/2007 | Marks et al. |
| 7,416,186 B2 | 8/2008 | Walker |
| 7,452,273 B2 | 11/2008 | Amaitis et al. |
| 7,942,731 B2 | 5/2011 | Walker et al. |
| 8,186,682 B2 | 5/2012 | Amaitis et al. |
| 8,727,352 B2 | 5/2014 | Amaitis et al. |
| 8,734,226 B2 | 5/2014 | Heaton et al. |
| 8,771,078 B2 | 7/2014 | Miller et al. |
| 9,320,966 B2 | 4/2016 | Alderucci |
| 9,536,398 B2 | 1/2017 | Amaitis et al. |
| 9,761,082 B2 | 9/2017 | Alderucci |
| 9,911,288 B2 * | 3/2018 | Acres ...................... G07F 17/32 |
| 10,096,210 B2 | 10/2018 | Amaitis et al. |
| 10,287,332 B2 | 5/2019 | Cox et al. |
| 2001/0000778 A1 | 5/2001 | Sines et al. |
| 2001/0009867 A1 | 7/2001 | Sakaguchi et al. |
| 2001/0031654 A1 | 10/2001 | Walker et al. |
| 2001/0039205 A1 | 11/2001 | Adams et al. |
| 2002/0042298 A1 | 4/2002 | Soltys |
| 2002/0149590 A1 | 10/2002 | Townsend |
| 2002/0187834 A1 | 12/2002 | Rowe et al. |
| 2003/0006931 A1 | 1/2003 | Mages |
| 2003/0013516 A1 | 1/2003 | Walker et al. |
| 2003/0032474 A1 | 2/2003 | Kaminkow |
| 2003/0036422 A1 | 2/2003 | Baerlocher et al. |
| 2003/0045358 A1 | 3/2003 | Leen et al. |
| 2003/0109310 A1 | 6/2003 | Heaton et al. |
| 2003/0119824 A1 | 6/2003 | Redmond et al. |
| 2004/0053680 A1 | 3/2004 | Schultz |
| 2005/0102131 A1 | 5/2005 | Trower et al. |
| 2006/0148551 A1 | 7/2006 | Walker et al. |
| 2006/0247042 A1 | 11/2006 | Walker et al. |
| 2006/0282304 A1 | 12/2006 | Bedard |
| 2007/0049369 A1 * | 3/2007 | Kuhn .................. A63F 3/00157 463/12 |
| 2008/0113767 A1 | 5/2008 | Nguyen et al. |
| 2008/0248849 A1 | 10/2008 | Lutnick et al. |
| 2010/0113137 A1 | 5/2010 | Miller |
| 2014/0370951 A1 | 12/2014 | Amaitis et al. |
| 2015/0018077 A1 | 1/2015 | Heaton et al. |
| 2017/0178459 A1 | 6/2017 | Amaitis et al. |
| 2019/0287349 A1 * | 9/2019 | Cohen .................. G07F 17/323 |
| 2019/0355212 A1 | 11/2019 | Heaton et al. |

FOREIGN PATENT DOCUMENTS

| | | |
|---|---|---|
| GB | 2355627 | 4/2001 |
| GB | 2 399 299 | 9/2004 |
| JP | 2010015247 | 1/1998 |
| JP | H11-47355 | 2/1999 |
| JP | 2000181897 | 6/2000 |
| JP | 200510352 | 8/2000 |
| JP | 2001029649 | 2/2001 |
| JP | 2003-62333 | 3/2003 |
| JP | 5925232 | 4/2016 |
| WO | WO 94/01840 | 1/1994 |
| WO | WO 95/31264 | 11/1995 |
| WO | WO 1997/026061 | 8/2000 |
| WO | WO 01/53927 | 7/2001 |
| WO | WO 03/007254 | 1/2003 |
| WO | WO 03/049829 | 6/2003 |

OTHER PUBLICATIONS

DeepNet technologies website at http://deepnettech.com/blackjack.html, dated Feb. 5, 2002, retrieved Apr. 18, 2007 from the internet, 9 pages.

Unknown, "Blackjack", via www.wikipedia.com (online), Dec. 4, 2003 (retrieved on Apr. 3, 2006. Retrieved from the Internet: <URL:http://en.wikipedia.org/wiki/Blackjack>.

Winning Blackjack Pictures from actual game play, 9 pages of Game version 1.0, copyright 2001 downloaded Apr. 18, 2007, from <http://www.winsite.com/bin/info?2000000035531>.

WinSite.com (Winning Blackjack game info), retrieve from the internet Jul. 5, 2007 at <http://www.winsite.com/bin/info?2000000035531>.

Paul, Fredric, "Beat the House," Electronic Entertainment, Interplay Products, vol. 2, No. 6, Jun. 1995, p. 88.

(56) References Cited

OTHER PUBLICATIONS

Roginski, T,C., "Blackjack Royale Version 2.0 Is a Royal Blackjack Trainer" Rainbow Dec. 1984. vol. 4 No. 5, p. 217 Abstract Only.
Roginski, T.C., "Blackjaq: A Blackjack Trainer", Rainbow, Nov. 1983, vol. 3, No. 4 p. 250, Abstract Only.
Unknown, "Blackjack Trainer—Blackjack Training Program," vol. 10, No. 10, British Library, MacWorld, Oct. 1, 1993, p. 85.
Berte, Stephen, "The SERIOUS Blackjack Tutor," PCM, vol. 8, No. 6, Dec. 1, 1990 p. 79-80.
Unknown, "Beat the Casino 2004: How to Win at Blackjack and Other Casino Games" Newswire Association, LLC Jun. 22, 2004.
Canadian Office Action for Application No. 2,470,117 dated Jul. 18, 2011 (4 pages).
Great Britain Office Action for Application No. 0415431.6 dated Jul. 21, 2006 (2 pages).
Great Britain Office Action for Application No. 0415431.6 dated Dec. 19, 2005 (2 pages).
International Search Report for International Application No. PCT/US02/39554 dated Feb. 28, 2003 (4 pages).
Australian Examiner's Report for Application No. 2006206764, dated Aug. 12, 2010 (2 pages).
European Communication and Extended Search Report for Application No. EP 06717981.2, dated Jul. 11, 2011 (5 pages).
Japanese Office Action with English Translation for Application No. 2007-550567, dated Nov. 22, 2011 (8 pages).
International Search Report for International Application No. PCT/US06/000848 dated Jun. 27, 2006 (4 pages).
Canadian Office Action for Application No. 2,470,117 dated May 22, 2012 (4 pages).
PCT Written Opinion of the International Searching Authority for International Application No. PCT/US06/000848 dated Jun. 27, 2006 (8 pages).
Australian Examiner's Report for Application No. 2012202770, dated Nov. 29, 2013 (3 pages).
Canadian Examiner's Report for Application No. 2,593,754, dated Oct. 17, 2013 (3 pages).
European Communication for Application No. 06717981.2, dated May 17, 2013 (5 pages).
Japanese Office Action with English Translation for Application No. 2007-550567, dated Aug. 7, 2012 (4 pages).
Japanese Office Action with English Translation for Application No. 2007-550567, dated Jul. 2, 2013 (7 pages).
"Dark-Side Techniques for Making Money on the Net", PC Japan, Softbank Publishing Corp. Oct. 1, 2003, vol. 8(10): 145-149.
Canadian Examiner's Report for Application No. 2,470,117, dated Nov. 28, 2014 (6 pages).
Canadian Examiner's Report for Application No. 2,593,754 dated Apr. 2, 2015 (4 pages).
Japanese Office Action with English Translation for Application No. 2014-052285, dated Mar. 31, 2015 (4 pages).
Canadian Examiner's Report for Application No. 2470117 dated Mar. 10, 2016 (4 pages).
Australian First Examiner's Report for Application No. 2015218413 dated Aug. 26, 2016 (2 pages).
Canadian Notice of Allowance for Application No. 2,593,754 dated Jul. 14, 2016 (2 pages).
Canadian Examiner's Report for Application No. 2470117 dated Mar. 31, 2017 (8 pages).
Australian Second Examiner's Report for Application No. 2015218413 dated Aug. 18, 2017 (3 pages).
Australian First Examiner's Report for Application No. 2017216455 dated Sep. 21, 2018 (3 pages).
Australian Second Examiner's Report for Application No. 2017216455 dated Nov. 2, 2018 (6 pages).
Wikipedia Article Blackjack. (Wikipedia article @Blackjack.pdf) dated May 11, 2018, 8 pages.

* cited by examiner

FIG. 2A

| PLAYER'S HAND | AVERAGE RETURN FOR "HITTING" (PER $1 INITIAL BET) | AVERAGE RETURN FOR "STANDING" (PER $1 INITIAL BET) | AVERAGE RETURN FOR "DOUBLING" (PER $1 INITIAL BET) | AVERAGE RETURN FOR "SPLITTING" (PER $1 INITIAL BET) |
|---|---|---|---|---|
| HARD 19 | ($0.7260) | $0.4395 | ($1.4520) | N/A |
| HARD 18 (NO PAIR) | ($0.6200) | $0.1996 | ($1.2305) | N/A |
| HARD 17 | ($0.5230) | ($0.0449) | ($1.0460) | N/A |
| HARD 16 (NO PAIR) | ($0.4495) | ($0.1672) | ($0.8990) | N/A |
| HARD 15 | ($0.3855) | ($0.1672) | ($0.7709) | N/A |
| HARD 14 (NO PAIR) | ($0.3214) | ($0.1672) | ($0.6428) | N/A |
| HARD 13 | ($0.2573) | ($0.1672) | ($0.5147) | N/A |
| HARD 12 (NO PAIR) | ($0.1933) | ($0.1672) | ($0.3865) | N/A |
| 11 | $0.3037 | ($0.1672) | $0.6147 | N/A |
| 10 (NO PAIR) | $0.2563 | ($0.1672) | $0.5125 | N/A |
| 9 | $0.1580 | ($0.1672) | $0.2431 | N/A |
| 8 (NO PAIR) | $0.0708 | ($0.1672) | $0.0035 | N/A |
| 7 | ($0.0073) | ($0.1672) | ($0.2027) | N/A |
| 6 (NO PAIR) | ($0.0349) | ($0.1672) | ($0.3156) | N/A |
| 5 | ($0.0240) | ($0.1672) | ($0.3344) | N/A |
| A, A | $0.1565 | ($0.1672) | $0.1260 | $0.6147 |
| 10, 10 | ($0.8545) | $0.6704 | ($1.7090) | $0.3804 |
| 9, 9 | ($0.6200) | $0.1996 | ($1.2305) | $0.3920 |
| 8, 8 | ($0.4495) | ($0.1672) | ($0.8990) | $0.2975 |
| 7, 7 | ($0.3214) | ($0.1672) | ($0.6428) | $0.1467 |
| 6, 6 | ($0.1933) | ($0.1672) | ($0.3865) | $0.0809 |
| 5, 5 | $0.2563 | ($0.1672) | $0.5125 | ($0.0192) |
| 4, 4 | $0.0708 | ($0.1672) | $0.0035 | $0.0819 |
| 3, 3 | ($0.0729) | ($0.1672) | ($0.3156) | $0.1263 |
| 2, 2 | ($0.0124) | ($0.1672) | ($0.3344) | $0.1517 |
| A, 9 | $0.2563 | $0.6704 | $0.5125 | N/A |
| A, 8 | $0.2030 | $0.4395 | $0.4060 | N/A |
| A, 7 | $0.1476 | $0.1996 | $0.2952 | N/A |
| A, 6 | $0.0912 | ($0.0449) | $0.1824 | N/A |
| A, 5 | $0.0734 | ($0.1672) | $0.1260 | N/A |
| A, 4 | $0.0920 | ($0.1672) | $0.1260 | N/A |
| A, 3 | $0.1119 | ($0.1672) | $0.1260 | N/A |
| A, 2 | $0.1334 | ($0.1672) | $0.1260 | N/A |

FIG 2B

| PLAYER'S HAND | INDICATOR 18a FOR BUTTON 16a ("HIT" BUTTON) | INDICATOR 18b FOR BUTTON 16b ("STAND" BUTTON) | INDICATOR 18c FOR BUTTON 16c ("DOUBLE/SPLIT/ INSURANCE" BUTTON) |
|---|---|---|---|
| HARD 19 | RED | GREEN | DOUBLE: RED |
| HARD 18 (NO PAIR) | RED | GREEN | DOUBLE: RED |
| HARD 17 | RED | GREEN | DOUBLE: RED |
| HARD 16 (NO PAIR) | RED | GREEN | DOUBLE: RED |
| HARD 15 | RED | GREEN | DOUBLE: RED |
| HARD 14 (NO PAIR) | RED | GREEN | DOUBLE: RED |
| HARD 13 | YELLOW | GREEN | DOUBLE: RED |
| HARD 12 (NO PAIR) | YELLOW | GREEN | DOUBLE: RED |
| 11 | RED | RED | DOUBLE: GREEN |
| 10 (NO PAIR) | RED | RED | DOUBLE: GREEN |
| 9 | YELLOW | RED | DOUBLE: GREEN |
| 8 (NO PAIR) | GREEN | RED | DOUBLE: YELLOW |
| 7 | GREEN | RED | DOUBLE: YELLOW |
| 6 (NO PAIR) | GREEN | RED | DOUBLE: RED |
| 5 | GREEN | RED | DOUBLE: RED |
| A, A | RED | RED | SPLIT: GREEN |
| 10, 10 | RED | GREEN | SPLIT: RED |
| 9, 9 | RED | YELLOW | SPLIT: GREEN |
| 8, 8 | RED | RED | SPLIT: GREEN |
| 7, 7 | RED | RED | SPLIT: GREEN |
| 6, 6 | RED | RED | SPLIT: GREEN |
| 5, 5 | RED | RED | DOUBLE: GREEN |
| 4, 4 | YELLOW | RED | SPLIT: GREEN |
| 3, 3 | YELLOW | RED | SPLIT: GREEN |
| 2, 2 | YELLOW | RED | SPLIT: GREEN |
| A, 9 | RED | GREEN | DOUBLE: YELLOW |
| A, 8 | RED | GREEN | DOUBLE: YELLOW |
| A, 7 | YELLOW | YELLOW | DOUBLE: GREEN |
| A, 6 | YELLOW | RED | DOUBLE: GREEN |
| A, 5 | YELLOW | RED | DOUBLE: GREEN |
| A, 4 | YELLOW | RED | DOUBLE: GREEN |
| A, 3 | YELLOW | RED | DOUBLE: GREEN |
| A, 2 | GREEN | RED | DOUBLE: YELLOW |

METHOD AND APPARATUS FOR PROVIDING ADVICE REGARDING GAMING STRATEGIES

CROSS REFERENCE TO RELATED APPLICATIONS

This application is a continuation of U.S. patent application Ser. No. 16/149,610 filed on Oct. 2, 2018 which is a continuation of U.S. patent application Ser. No. 15/390,018 filed on Dec. 23, 2016 (now U.S. Pat. No. 10,096,210 issued on Oct. 9, 2018) which is a continuation of U.S. patent application Ser. No. 14/279,779 filed May 16, 2014 (now U.S. Pat. No. 9,536,396 issued on Jan. 3, 2017) which is a continuation of U.S. patent application Ser. No. 13/481,096 filed May 25, 2012 (now U.S. Pat. No. 8,727,352 issued on May 20, 2014) which is a continuation of U.S. patent application Ser. No. 12/249,249 filed Oct. 10, 2008 (now U.S. Pat. No. 8,186,682 issued on May 29, 2012) which is a continuation of U.S. patent application Ser. No. 11/032,724, filed Jan. 10, 2005 (now U.S. Pat. No. 7,452,273 issued on Nov. 18, 2008), all of which are hereby incorporated by reference herein in their entireties.

TECHNICAL FIELD OF THE INVENTION

This invention relates in general to gaming methods and apparatuses, more particularly, to systems and apparatuses for providing advice regarding gaming strategies.

BACKGROUND OF THE INVENTION

A player's objective in blackjack is to beat the dealer (in other words, the house) with cards totaling equal to or less than 21, without going over 21, which is known as "busting." The house has a slight advantage due to the fact that the player must go first and if the player busts, the player automatically loses even if the dealer would have or does subsequently bust.

Before the cards are dealt for each blackjack hand, the player selects the amount he wishes to wager on that hand. The dealer then deals two cards to the player, and two to himself—one face up and one face down. Face cards (kings, queens and jacks) count as 10, aces count as one or 11 (as the player chooses) and all other cards are counted at their face value.

Depending on the pair of cards that are dealt to the dealer and the player, various options are available to the player. If the pair of cards dealt to the player equal 21 (i.e., an ace and a 10 or face card), the player has blackjack and wins the hand unless the dealer also has a blackjack, in which case the hand is a tie, also known as a "push." A winning blackjack typically pays the player 3 to 2 odds on his wager. If the pair of cards dealt to the player do not equal 21, the player may hit or stand, or in certain circumstances, the player may take insurance, split a pair, double down, surrender, or take even money.

The player may "hit" if he wants another card, or "stand" if he is satisfied with the total of his hand and does not want another card. The player may typically hit as many times as he wishes before standing, as long as the player's total does not exceed 21. If any hit causes the player's total to exceed 21, the player busts and automatically loses the hand. If the dealer's face-up card is an ace, the player is given an option to make an insurance wager, which is a side bet that the dealer's face-down (hole) card will be a ten-value card (i.e., either a 10 or a face card). The players can make an insurance bet equal to one half of the player's initial bet on the hand. If the dealer's down card is revealed to be a ten-value card, the player wins the insurance bet at 2 to 1 odds. If the dealer's down card is revealed to be any other card, the player loses the insurance bet.

SUMMARY OF THE INVENTION

In one embodiment, a method of providing advice in a blackjack game is provided. One or more first player cards associated with a blackjack hand are identified for a first player and one or more second player cards associated with the blackjack hand are identified for a second player. The first and second player cards are displayed to the first player. A probability associated with a first one of the plurality of playing options is determined based at least on a set of predetermined statistical blackjack data, the one or more first player cards, and the one or more second player cards. It is then determined, based at least on the determined probability associated with the first playing option, whether to display a first indication corresponding with first advice regarding the first playing option, a second indication corresponding with second advice regarding the first playing option, or a third indication corresponding with third advice regarding the first playing option. In some embodiments, the first player may then select from the plurality of playing options and the blackjack hand may continue.

In another embodiment, an apparatus for managing a blackjack game is provided. The apparatus includes a first display portion, a second display portion, an advice display, a memory, and a processor. The first display portion displays first player cards and the second display portion displays second player cards. The plurality of option selection interfaces allow a player to select from a plurality of playing options. The advice display is operable to display advice regarding a first one of a plurality of playing options. The memory is operable to store, at least temporarily, a set of predetermined statistical blackjack data, one or more first player cards associated with a blackjack hand for a first player, and one or more second player cards associated with the blackjack hand for a second player. The processor is operable to cause the one or more first player cards to be displayed in the first display and the one or more second player cards to be displayed in the second display, and determine a probability associated with the first playing option based at least on the set of predetermined statistical blackjack data, the one or more first player cards, and the one or more second player cards. The processor may further determine, based at least on the determined probability associated with the first playing option, whether to display a first indication corresponding with first advice regarding the first playing option, a second indication corresponding with second advice regarding the first playing option, or a third indication corresponding with third advice regarding the first playing option. The processor may then cause the determined first indication, second indication, or third indication to be displayed via the advice display. In some embodiments, the apparatus further includes a plurality of option selection interfaces allowing the player to select from the plurality of playing options.

Various embodiments of the present invention may benefit from numerous advantages. It should be noted that one or more embodiments may benefit from some, none, or all of the advantages discussed below.

One advantage is that methods and apparatuses are provided for providing a person advice regarding various playing options in a game such as blackjack, craps, or poker, for example. For instance, in some embodiments, an apparatus is provided that enables a player to play a blackjack game against a dealer entity. The apparatus automatically determines probabilities associated with particular playing options during a blackjack hand based on predetermined statistical blackjack information, and indicates advice to the player regarding such playing options based on the determined probabilities associated with such playing options. In certain embodiments, the apparatus may indicate at least three different types of advice to a player regarding a particular playing option. For example, for each available playing option, the apparatus may communicate advice indicating: (a) that the playing option is the most statistically advantageous playing option available to the player, (b) that the playing option is slightly less advantageous (e.g., within a statistical threshold) than the most statistically advantageous available playing option, or (c) that the playing option is significantly less advantageous (e.g., beyond a statistical threshold) than the most statistically advantageous available playing option. The player may use such advice in determining which available playing option to select. The player may select a playing option and the blackjack hand may continue. By using the playing advice provided by the apparatus, the player may increase his or her chances of winning blackjack hands and/or his or her average return on blackjack hands.

In other embodiments, an apparatus is provided that enables a player to select cards to be assigned to the player's hand and/or to a dealer hand, and to receive automatically-generated advice regarding various playing options. For example, a player may desire advice for various playing options in a situation in which the player is dealt a "3" and a "6" (for a two-card total of 9) and the dealer has a "4" face-up card. The player may then use player interfaces to select these cards for the player's hand and the dealer's hand, and then request automatically-generated advice regarding various available playing options. The automatically-generated advice may be generated based on analysis of the cards selected by the player and a set of predetermined statistical blackjack information. For example, as discussed above, for each available playing option, the apparatus may communicate advice indicating: (a) that the playing option is the most statistically advantageous playing option, (b) that the playing option is slightly less advantageous than the most statistically advantageous available playing option, or (c) that the playing option is significantly less advantageous than the most statistically advantageous available playing option. The player may use the apparatus while playing a live blackjack game, such as at a casino or while playing online for example, in order to obtain advice regarding situations in the live game. By using the apparatus in this manner to simulate live game situations to obtain advice regarding various playing options, the player may increase his or her chances of winning blackjack hands and/or his or her average return on blackjack hands. In addition, the apparatus, which includes a computer or automated computing device, may perform relatively sophisticated calculations that may not be performed by the player or by a human dealer (such as a casino dealer, for example) in real time or substantially in real time.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 2A-2B illustrate an example set of predetermined statistical blackjack data based on average return per unit wagered according to one embodiment of the invention;

DETAILED DESCRIPTION OF EXAMPLE EMBODIMENTS OF THE INVENTION

Figure 1A:
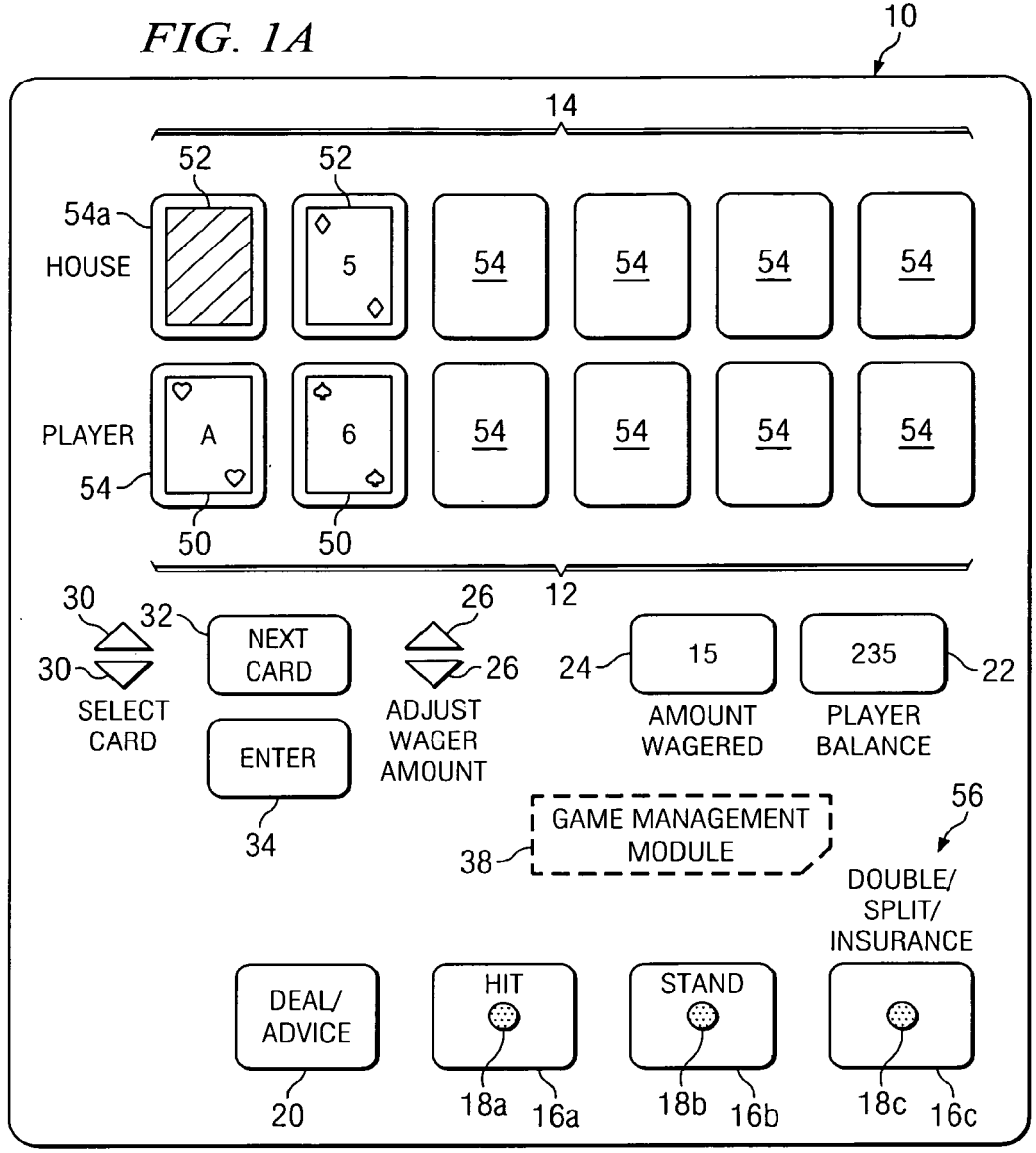
FIG. 1A illustrates an example apparatus for providing players advice regarding possible playing options in a blackjack game in accordance with an embodiment of the present invention.

FIG. 1A illustrates an example apparatus 10 for providing players advice regarding possible playing options in a blackjack game in accordance with an embodiment of the present invention. Such playing options may include, for example, options to hit, stand, double down, split a pair, take insurance and/or surrender. In general, apparatus 10 provides advice to a user regarding the probabilities of selecting various playing options during a blackjack hand. In some embodiments, such advice includes advice regarding a particular playing option, such as how statistically advantageous the particular option is or whether the particular option is statistically the best available option for the player (such as whether the particular option will maximize the player's chances of winning the hand or maximize the player's potential return on the hand, for example). In particular embodiments, advice regarding a particular playing option may include any of the following advice: (a) an indication that the particular playing option is statistically advantageous to the player (e.g., the option that provides the player the highest average return of the available options), (b) an indication that the particular playing option is slightly statistically disadvantageous to the player (e.g., an option that provides the player a slightly lower average return than that of the best available option), or (c) an indication that the particular playing option is substantially statistically disadvantageous to the player (e.g., an option that provides the player a significantly lower average return than that of the best available option). Such advice determined by apparatus 10 may be communicated to the player using a variety of colored lights, symbols, or in any other suitable manner.

By using a computer processor or other automated computing devices, apparatus 10 may perform the relatively sophisticated odds calculations for determining advice to communicate to the player in real time or substantially in real time such that the player may use the advice in determining which playing options to select. Such calculations may not similarly be performed by a human player or dealer (such as a casino player or dealer, for example) in real time. Thus, apparatus 10 may offer a variety of functions—including providing real time or substantially real time playing advice—that could not previously be offered in a casino or other non-computerized system.

In some embodiments, apparatus 10 provides gaming functionality that enables a player to play a blackjack game against a dealer entity. Apparatus 10 automatically determines probabilities associated with particular playing options during a blackjack hand based on predetermined statistical blackjack information, and indicates advice to the player regarding such playing options based on the determined probabilities associated with such playing options. In addition, in some embodiments, apparatus 10 may allow a player to select particular cards for the player's hand and a dealer's hand such that the player may simulate live game situations to obtain advice regarding various playing options in various game situations. In such embodiments, the player may use apparatus 10 while playing a live blackjack game, such as at a casino or while playing online for example, in order to obtain advice regarding situations occurring in the live game, and thereby increase the player's chances of winning blackjack hands and/or the player's average return on blackjack hands. In the particular embodiment shown in FIG. 1A and discussed herein, apparatus 10 may provide both types of functionality. In particular, apparatus 10 may be used by a player for (a) playing blackjack games against a dealer entity via apparatus 10, and (b) obtaining playing advice regarding game situations entered by a player.

In the embodiment shown in FIG. 1A, apparatus 10 is a portable, hand-held device that includes a first display portion 12, a second display portion 14, a plurality of option selection interfaces 16, a plurality of advice indicators 18, a deal/advice interface device 20, a player balance display 22, an amount wagered display 24, an amount wagered adjustment device 26, a card selection device 30, a next card device 32, an enter selection device 34, and a game management module 38.

First display portion 12 may be operable to display representations of one or more first player cards 50 determined for a first player, and second display portion 16 may be operable to display representations of one or more second player cards 52 determined for a second player. The first player may be the human player using apparatus 10, while the second player may be a human or computerized player representing a dealer or house entity. First display portion 12 and second display portion 16 may comprise any suitable device or devices for displaying representations of first player cards 50 and second player cards 52, such as one or more light bulbs, light emitting diodes (LEDs), liquid crystal displays (LCDs), plasma devices, digital light processing (DLP) devices, or cathode ray tube (CRT) devices, for example. Representations of first player cards 50 and second player cards 52 may comprise any suitable indications of the value and/or the suit of each first player card 50 and second player card 52. Example representations of a first player card 50 or a second player card 52 may include a photo image of a card, a representational image of a card, or a representation of a number value (e.g., 1-11) or card value (e.g., 1-10, Jack, Queen, King, Ace) and/or a representation of a card suit (e.g., diamonds, hearts, clubs or spades).

In some embodiments, first display portion 12 and/or second display portion 16 each comprise a single display operable to display a number of cards. In other embodiments, first display portion 12 and/or second display portion 16 include a number of distinct displays 54, each operable to display a single card. For example, in the embodiment shown in FIG. 1A, first display portion 12 includes six distinct displays 54 such that up to six cards may be displayed for the first player's hand, and second display portion 14 includes six distinct displays 54 such that up to six cards may be displayed for the second player's hand. A particular distinct display 54 of second display portion 16, indicated in FIG. 1A as 54a, may be used for displaying a face-down (or "hole") card dealt to the second player's hand (i.e., the dealer or house entity's hand). Any number of distinct displays 54 may be used.

Option selection interfaces 16 may comprise any one or more suitable interface devices for allowing a human player to select from a plurality of playing options. For example, option selection interfaces 16 may comprise buttons, switches or touch pads that may be manipulated by a human player. An option selection interface 16 may correspond with one or more particular playing options. In some embodiments, one or more option selection interfaces 16 may have an associated label identifying a corresponding playing option and/or include a display operable to display multiple playing options for a particular option selection interface 16. In the embodiment shown in FIG. 1A, option selection interfaces 16 include three buttons 16a, 16b and 16c. The first button 16a corresponds with a "Hit" playing option and is labeled as "Hit." The second button 16b corresponds with a "Stand" playing option and is labeled as "Stand." The third button 16c corresponds with a variety of other playing options, such as "Double down," "Split" and/or "Take insurance," for example, and has an associated display 56 operable to display any of such various playing options, depending on which of such options may be available and/or have the greatest associated odds or average return at particular times during a blackjack hand.

For example, if the player is dealt a 5 and a 6, for a total of 11, apparatus 10 may determine that of the options corresponding with third button 16c, the "double down" option has the greatest associated odds or average return for the player, and thus display 56 may display "Double" to indicate that pressing button 16c will initiate a "double down" option for the player. Similarly, if the player is dealt a pair of 8's, apparatus 10 may determine that of the options corresponding with third button 16c, the "split" option has the greatest associated odds or average return for the player, and thus display 56 may display "Split" to indicate that pressing button 16c will initiate a "split" option for the player. It should be understood that in other embodiments, apparatus 10 may have any suitable number of option selection interfaces 16 (such as buttons, for example), and that each of such option selection interfaces 16 may correspond to any number of playing options. For example, in some embodiments, apparatus 10 includes a separate button 16 for each possible playing option.

Advice indicators 18 may comprise any suitable device(s) for indicating various types of advice to a player. Particular advice indicators 18 may correspond to particular playing interfaces 16 such that advice indicators 18 may indicate advice regarding the particular playing options associated with such playing interfaces 16. For example, in the embodiment shown in FIG. 1A, apparatus 10 includes three advice indicators 18a, 18b and 18c corresponding to option selection interfaces 16a, 16b and 16c, respectively. Thus, advice indicators 18a, 18b and 18c may communicate advice regarding the playing options corresponding with option selection interfaces 16a, 16b and 16c.

Advice indicators 18 may comprise devices operable to display or produce one or more lights, symbols, sounds, or any other output which may be used to communicate various types of advice to a player. Advice indicators 18 may be located on, adjacent to, or otherwise associated with their corresponding option selection interfaces 16. In the embodiment shown in FIG. 1A, each advice indicator 18a, 18b and 18c is a device (such as a bulb or LCD, for example) that may light either green, red, or yellow to indicate one of three types of advice. For example, indicator 18a, which corresponds to the "Hit" button 16a, may (a) light green to indicate that "hitting" is statistically the best available option for the player, (b) light yellow to indicate that "hitting" would be slightly statistically disadvantageous for the player, or (c) light red to indicate that "hitting" would be substantially statistically disadvantageous for the player. Similarly, indicators 18b and 18c may use green, yellow, and red lights to provide advice regarding corresponding options provided by selection interfaces 16 and 16c. Any suitable color of lights may be used.

Deal/advice interface device 20 may comprise any one or more suitable interface devices for allowing a human player to select a "Deal" command to initiate a new hand to be dealt and/or to request advice from apparatus 10 regarding various playing options for a particular game situation. For example, deal interface device 20 may comprise a button, switch, or touch pad that may be manipulated by a human player.

Player balance display 22 is operable to display a player's current balance, which may be defined in any suitable manner (such as in dollars, chips, or units, for example). The current balance may be automatically updated at various times, such as after a bet is placed and/or after a payout for a hand, for example. Amount wagered display 24 is operable to display the amount that a player is wagering on a particular hand (such as the previous hand, the current hand, or the next hand), and may also be defined in any suitable manner (such as in dollars, chips, or units, for example). Like first and second display portions 12 and 14, player balance display 22 and amount wagered display 24 may comprise any suitable device or devices for displaying representations of the player's current balance and the amount that the player is wagering on the current hand, respectively. For example, player balance display 22 and amount wagered display 24 may comprise one or more bulbs, light emitting diodes (LEDs), liquid crystal displays (LCDs), plasma devices, digital light processing (DLP) devices, or cathode ray tube (CRT) devices.

Amount wagered adjustment device 26 may comprise any one or more suitable interface devices for allowing a human player to increase or decrease the amount that the player wishes to wager on a particular hand. For example, amount wagered adjustment device 26 may comprise one or more buttons, switches, or touch pads that may be manipulated by a human player. The selected wager amount may be displayed in amount wagered display 24.

Card selection device 30, next card device 32, and enter selection device 34 are generally operable to allow a player to select one or more first player cards 50 and second player cards 52 for the player's hand and/or the dealer's (or house's) hand in order to simulate a particular game situation to obtain advice for the particular game situation regarding various playing options. As shown in FIG. 1A, card selection device 30 may comprise any one or more suitable interface devices for allowing a human player to select the number value (e.g., 1-11) or card value (e.g., 1-10, Jack, Queen, King, Ace) for a particular first player card 50 or second player card 52. For example, card selection device 30 may allow a player to scroll through a series of different card values until the player has identified the appropriate value for the particular first or second player card 50, 52. The player may then use the "enter selection" device 34 to enter or submit the selected value for the particular first or second player card 50, 52. Next card device 32 may comprise any one or more suitable interface devices for allowing a human player to move to another first or second player card 50, 52, which may then be selected using card selection device 30. For example, after selecting the card value for a particular first or second player card 50, 52 and pressing enter selection button 34 to submit the selected card value, the player may then press next card button 32 to move to another particular first or second player card 50, 52. In this manner, a player may select, or assign, values to one or more first and/or second player cards 50, 52. In some embodiments, card selection device 30 and next card device 32 may comprise one or more buttons, switches or touch pads that may be manipulated by a human player.

Figure 1B:
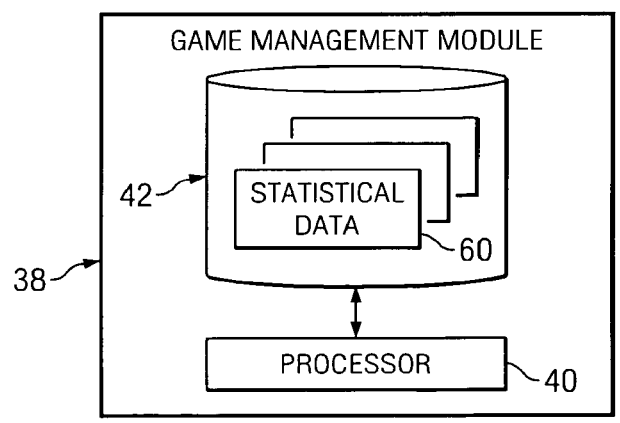
FIG. 1B illustrates game management module of the apparatus of FIG. 1A in accordance with an embodiment of the present invention.

As shown in FIG. 1B, game management module 38 may include a processor 40 coupled to a memory 42 to manage blackjack gaming for a player regarding various playing options. Processor 40 may be operable to execute various algorithms or instructions to provide various functions related to managing blackjack gaming for a player, such as for example, determining first and second player cards 50 and 52, determining which playing options are available to the player, determining probabilities associated with various playing options, determining advice associated with such playing options based on the determined probabilities, causing such advice to be communicated to the player via advice indicators 18, receiving playing options selected by the player via option selection interfaces 16, causing such selected playing options to be implemented, determining the result of blackjack hands, and determining payouts for blackjack hands. Processor 40 may comprise any suitable processor that executes a blackjack software application or other computer instructions, such as a central processing unit (CPU) or other microprocessor, and may include any suitable number of processors working together.

Memory 42 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or any other suitable volatile or non-volatile memory device.

Memory 42 is generally operable to store various information that may be used by processor 40 in performing any functions related to managing blackjack gaming, such as any of the various functions discussed above. Memory 42 may store this information in any suitable number of databases, which may be co-located or physically and/or geographically distributed.

In the example embodiment shown in FIG. 1B, memory 42 may store a set of predetermined statistical blackjack data 60 regarding a variety of blackjack game situations. In some embodiments, predetermined statistical blackjack data 60 comprises predetermined probabilities regarding the effect of various playing options in a variety of situations in a blackjack hand. For example, predetermined statistical blackjack data 60 may comprise the predetermined average return on a bet (per unit wagered) if each of a variety of playing options is selected by the player. For instance, it may be predetermined that if the dealer has a "7" up-card and the player has a two-card total of 11, the predetermined average return for the player per $1 initial bet for each of the following playing options may be as follows:

| | |
|---|---|
| Hit . . . | +$0.26 |

| | |
|---|---|
| Stand . . . | −$0.42 |
| Double . . . | +$0.48 |

A particular example of predetermined statistical blackjack data 60 based on average return per unit wagered is discussed in greater detail below with reference to FIGS. 2A-2B.

As another example, for example, predetermined statistical blackjack data 60 may comprise the likelihood of a player winning a hand if each of a variety of playing options is selected by the player. As yet another example, predetermined statistical blackjack data 60 may comprise predetermined probabilities of each of a variety of playing options being advantageous to the player as compared to other playing options. Whether a particular playing option is "advantageous" to the player may be defined according to one or more criteria, such as (a) whether selecting the particular playing option would increase or maximize the first player's odds of winning the blackjack hand as compared to selected other available playing option(s) and/or (b) whether selecting the particular playing option from the available playing options would increase or maximize the first player's average return on the blackjack hand as compared to selected other available playing option(s). Thus, predetermined statistical blackjack data 60 may comprise odds, probabilities, average returns, or any other statistical information, in any suitable format, regarding the advantageousness of particular playing options. In particular embodiments, certain predetermined statistical blackjack data 60 may be based in part upon assumptions regarding which playing options will be selected by the player. For example, certain predetermined statistical blackjack data 60 regarding the statistical effect of a player selecting various playing options at a particular point in a hand may be based in part upon an assumption that the player's subsequent playing decisions in that same hand (if any) will be the statistically optimal decisions for the relevant situation in the hand (in other words, it may be assumed that the player will play the rest of the hand "by the book").

FIGS. 2A-2B illustrate an example set of predetermined statistical blackjack data 60 based on average return (or profit) per unit wagered according to one embodiment of the invention. FIG. 2A is a table 100 illustrating predetermined statistical blackjack data 60 regarding various playing options for a variety of player hands in a situation in which the up-card for the dealer's hand is a "5" after the initial pair of cards are dealt to each of the player and the dealer (and displayed in first display portion 12 and second display portion 14, respectively, of apparatus 10). Column 102 lists each possible player hand; column 104 indicates the average return on the hand per $1 initial bet if the player selects the "hit" option at this point in the hand; column 106 indicates the average return on the hand per $1 initial bet if the player selects the "stand" option at this point in the hand; column 108 indicates the average return on the hand per $1 initial bet if the player selects the "double" option at this point in the hand; and column 110 indicates the average return on the hand per 1 initial bet if the player selects the "split" option at this point in the hand.

In this embodiment, "double" and "split" are shared by the same button 16c on apparatus 10, and thus only the one with the highest average return in a particular situation is made available to the player via button 16c in that situation. For example, if the player's hand is a pair of 5's, the average return associated with the "double" option are higher than the average return associated with the "split" option, and thus the option to "double" is made available to the player via button 16c, and the option to "split" is not made available to the player, as indicated by the abbreviation "N/A" in chart 100. In addition, in this embodiment, the "double" option is not made available to the player in certain circumstances, such as where the player has a hard 13 through a hard 19, for example, as indicated by the abbreviation "N/A" in table 100. In addition, in this embodiment, the odds stored in table 100 are based on the assumption that the player's subsequent playing decisions in the hand (if any) will be the statistically optimal decisions (in other words, it is assumed that the player will play the rest of the hand "by the book"). It should be understood that in various other embodiments of the invention, the availability of various playing options such as "double," "split" and/or "insurance" to the player may be otherwise managed, and the odds may be based on one or more other assumptions.

FIG. 2B is a table 120 corresponding with table 100 of FIG. 2A and illustrating the advice to be given to the player regarding the various playing options available to the player for a variety of player hands in the situation in which the dealer's up-card is a "5." Column 122 lists each possible player hand; column 124 indicates the advice to be communicated to the player regarding the "Hit" option; column 126 indicates the advice to be communicated to the player regarding the "Stand" option; and column 128 indicates the advice to be communicated to the player regarding the "Double" and "Split" options. In this particular embodiment, the following rules apply for determining the advice displayed by each advice indicator 18:

(a) if the average return for a particular playing option is the highest of any available playing option, the advice indicator 18 corresponding to that playing option is a green light;

(b) if the average return for a particular playing option is within a threshold value of the average return for the playing option having the highest average return, the advice indicator 18 corresponding to that playing option is a yellow light; and (c) if the average return determined for a particular playing option is more than the threshold lower than the odds for the playing option having the highest odds, the advice indicator 18 corresponding to that playing option is a red light.

In this example embodiment, a threshold value of 50.20 is used, such that if the average return for a particular playing option is within 50.20 of the average return for the playing option having the highest average return, the advice indicator 18 corresponding to that playing option is a yellow light. Thus, a green light is displayed for the most statistically advantageous playing option available to the player, a yellow light is displayed for playing options that are slightly less advantageous than (i.e., having an average return within $0.20 of) the most statistically advantageous playing option, and a red light is displayed for playing options that are substantially less advantageous than (i.e., having an average return of at least $0.20 less than) the most statistically advantageous playing option.

It should be understood that the threshold value may be any suitable value and determined in any suitable manner. For example, in an embodiment in which predetermined statistical blackjack data 60 comprises average returns for various playing options, the threshold value may be a particular amount per unit stake wagered. For instance, in certain embodiments, the threshold value may be a particular value between 0.05 and 0.40 of the unit stake wagered. In particular embodiments, the threshold value may be a particular value between 0.10 and 0.25 of the unit stake wagered. To illustrate, supposing the threshold value is 0.15, and the average return for a first playing option is 0.37, a second playing option having an average return of 0.23 would fall within the threshold (since 0.37−0.23=0.14), while a third playing option having an average return of 0.21 would fall outside the threshold (since 0.37−0.21=0.16).

As another example, in situations in which predetermined statistical blackjack data 60 comprise probabilities determined for various playing options (such as the odds of winning the hand associated with each available playing option, for example), the threshold value may be a particular percentage. For instance, in certain embodiments, the threshold value may be a particular percentage between 5% and 25%. In particular embodiments, the threshold value may be a particular percentage between 10% and 20%. To illustrate, supposing the threshold value is 10%, and the probability associated with a first playing option is 35%. A second playing option having an associated probability of 28% would fall within the threshold (since 35%−28%=7%), while a third playing option having an associated probability of 23% would fall outside the threshold (since 35%−23%=12%).

As another example, the threshold value may be a particular percentage difference between the average returns for different playing options. For instance, in certain embodiments, the threshold value may be a particular percentage between 5% and 50% of the unit stake wagered. In particular embodiments, the threshold value may be a particular value between 10% and 30% of the unit stake wagered. To illustrate, supposing the threshold value is 20%, and the probability determined for a first playing option is 0.40, a second playing option having a probability of 0.35 would fall within the threshold (since (0.40−0.35)/0.40=8% difference), while a third playing option having an average return of 0.25 would fall outside the threshold (since (0.40−0.25)/0.40=24% difference).

Although tables 100 and 120 shown in FIGS. 2A-2B illustrate only the situation in which the dealer's up-card is a "5," predetermined statistical blackjack data 60 may include similar average return (or profit) data for each possible dealer up-card. In addition, predetermined statistical blackjack data 60 may include a variety of sets of average return (or profit) data corresponding to various different criteria, such as different average return data for various blackjack rules (for example, average return data for a game in which the dealer must stand on soft 17 and average return data for a game in which the dealer must hit on soft 17), various average return data based on various assumptions (for example, assumptions regarding subsequent playing decisions made by the player), and average return data corresponding to different numbers of virtual decks involved in the game, for example. In addition, it should be understood that FIGS. 2A-2B are only one example of predetermined statistical blackjack data 60, and that predetermined statistical blackjack data 60 may include odds, probabilities, average returns, or any other statistical information, in any suitable format, regarding the advantageousness of particular playing options. For example, as discussed above, predetermined statistical blackjack data 60 may include, for various game situations, probability data regarding the likelihood of a player winning a blackjack hand if the player selects particular playing options and/or probability data regarding whether selecting particular playing options would increase or maximize a player's odds of winning a blackjack hand as compared to selected other available playing option(s).

Figure 3:
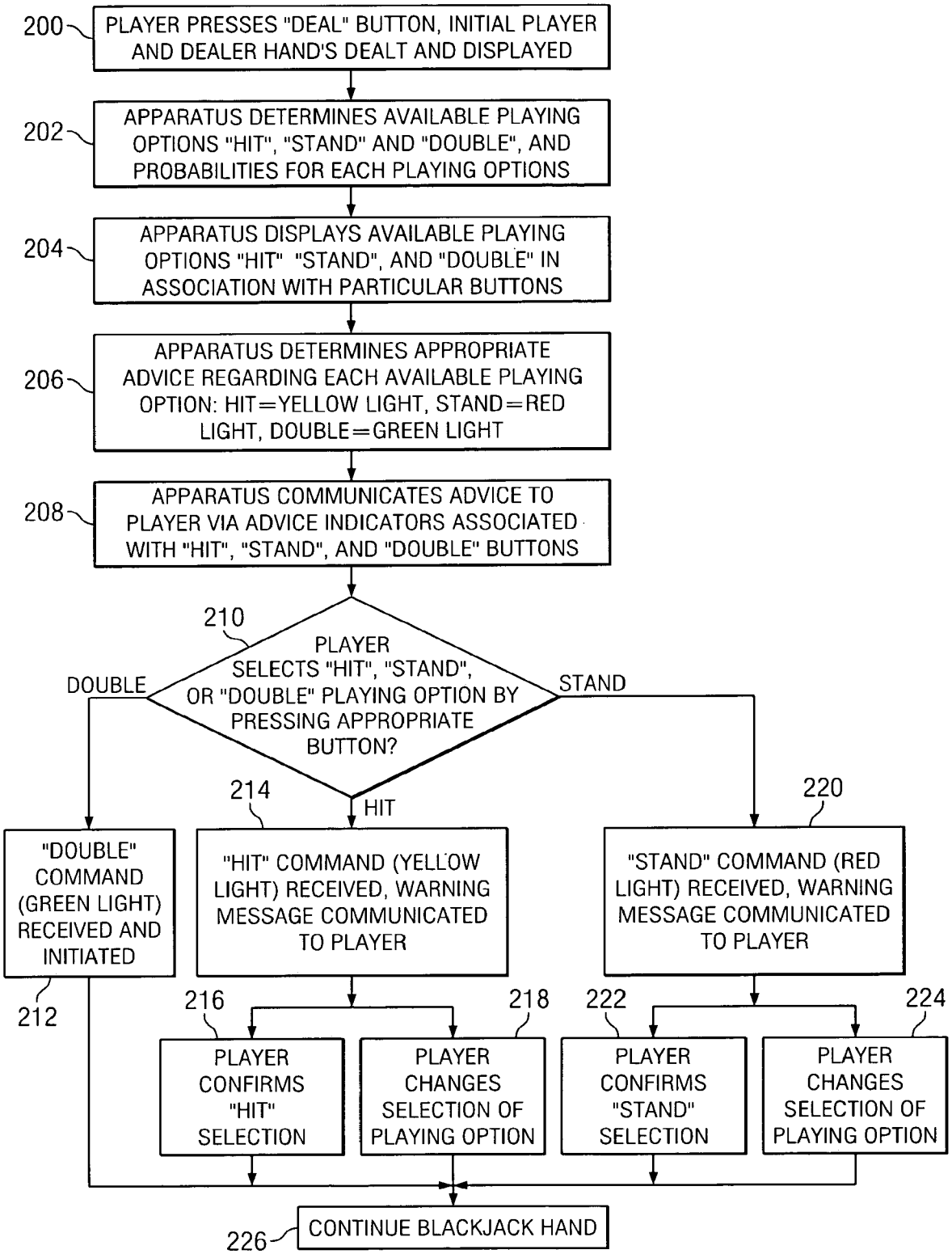
FIG. 3 illustrates an example method of a player playing a blackjack hand against a virtual dealer via the apparatus of FIG. 1A in accordance with one embodiment of the invention.

FIG. 3 illustrates an example method of a player playing a blackjack hand against a virtual dealer via apparatus 10 in accordance with one embodiment of the invention. At step 200, a player presses the "Deal/Advice" button 20, which causes game management module 38 to determine a pair of cards for the player and a pair of cards (one up-card and one down-card) for the dealer. The player's cards and the dealer's cards are displayed in first and second display portions 12 and 14, respectively. At step 202, game management module 38 determines (a) which playing options are available to the user, and (b) the probabilities associated with each of such available playing options. In this particular embodiment, the probabilities associated with each of such available playing options comprise the average return per unit wager for each of the available playing options, as defined by table 100 shown in FIG. 2A.

For example, suppose the player's cards are an "Ace" and a "6," and the dealer's face-up card is a "5." Game management module 38 may determine based on row 114 of table 100 (see FIG. 2A) that the playing options of "Hit," "Stand," and "Double," but not "Split" are available to the player. Thus, at step 204, management module 38 may cause the display 56 associated with third button 16c to display the word "Double," thus indicating to the player that the "Double" option is available to the player via third button 16c. As shown in table 100, the average return for the player if the player chooses to "Hit" would be +$0.0912, the average return for the player if the player chooses to "Stand" would be −$0.0449, and the average return for the player if the player chooses to "Double" would be +$0.1824.

At step 206, game management module 38 may determine based on table 120 (see FIG. 2B) the appropriate advice indications to communicate to the player regarding each of the available playing options: "Hit," "Stand," and "Double." According to row 130 of table 120, in this situation the appropriate advice for the "Hit" option is a yellow light, the appropriate advice for the "Stand" option is a red light, and the appropriate advice for the "Double" option is a green light. In particular, the "Double" option warrants a green light because it has the highest average return (+0.1824) of the options available to the player. The "Hit" option warrants a yellow light because its average return (+$0.0912) is within the relevant threshold (in this example embodiment, the threshold is 0.15) of the average return (+$0.1824) of the option having the highest average return (i.e., the "Double" option). The "Stand" option warrants a red light because its average return (−$0.0449) is more than the threshold ($0.15) less than the average return (+$0.1824) of the option having the highest average return (i.e., the "Double" option).

At step 208, the advice indications determined at step 206 are communicated to the player via advice indicators 18a, 18b and 18c associated with buttons 16a, 16b and 16c for the "Hit," "Stand," and "Double" playing options, respectively. In particular, advice indicator 18a lights up yellow, advice indicator 18b lights up red, and advice indicator 18c lights up green.

At step 210, the player selects one of the available playing options: "Hit," "Stand," or "Double" by pressing buttons 16a, 16b or 16c. The player may take into consideration the advice regarding such options as displayed by advice indicator 18a, 18b and 18c. If the player selects the "Double" option at step 210 by pressing button 16c, the "Double" command is received and initiated by game management module 38 at step 212.

Alternatively, if the player selects the "Hit" option at step 210 by pressing button 16a, game management module 38 may communicate a warning message to the player at step 214, such as by displaying a pop-up message and requiring the player to press button 16a again in order to initiate the "Hit" command. For example, the warning message may be a text message warning the player that the player has selected a "Yellow" (i.e., slightly statistically disadvantageous) option. If the player confirms his selection of the "Hit" option at step 216, the "Hit" command is received and initiated by game management module 38. Alternatively, the player may change his selection in response to receiving the warning message, such as by pressing button 16b (to "Stand") or 16c (to "Double"), at step 218.

Similarly, if the player selects the "Stand" option at step 210 by pressing button 16b, game management module 38 may communicate a warning message to the player at step 220, such as by displaying a pop-up message and requiring the player to press button 16b again in order to initiate the "Stand" command. For example, the warning message may be a text message warning the player that the player has selected a "Red" (i.e., substantially statistically disadvantageous) option. The warning message may be the same as, or different from, the warning message displayed in response to the player selecting a "Red" option, as discussed above regarding step 214. If the player confirms his selection of the "Stand" option at step 222, the "Stand" command is received and initiated by game management module 38. Alternatively, the player may change his selection in response to receiving the warning message, such as by pressing button 16a (to "Hit") or 16c (to "Double"), at step 224. After initiating the option selected by the player at step 210, game management module 38 may continue the management of the blackjack hand at step 226.

Figure 4:
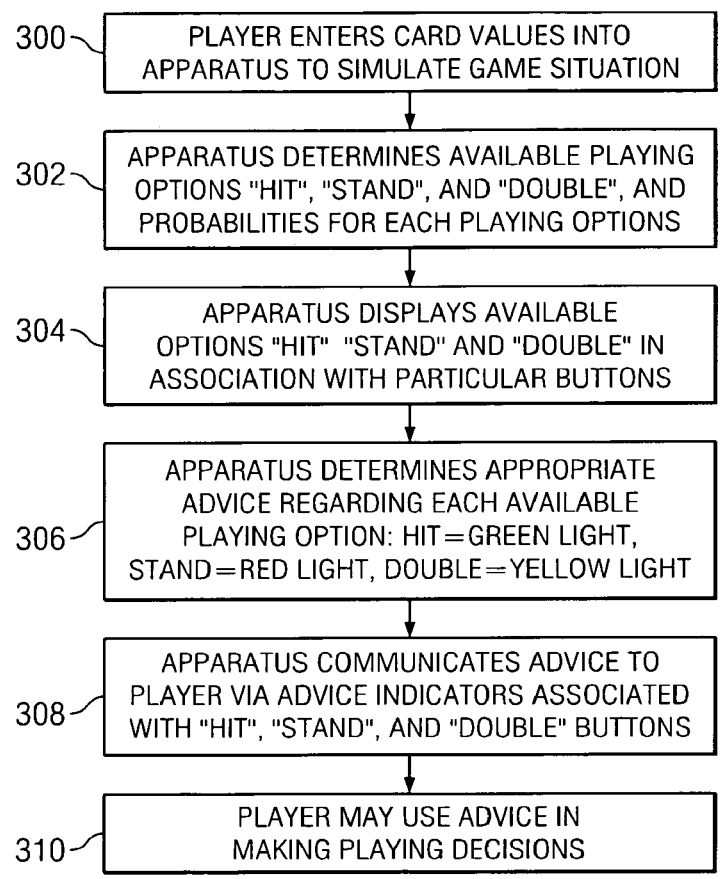
FIG. 4 illustrates an example method of using the apparatus of FIG. 1A for selecting a particular game situation and obtaining playing advice regarding the selected game situation in accordance with one embodiment of the invention.

FIG. 4 illustrates an example method of using the apparatus 10 to select a particular game situation and obtain playing advice regarding the selected game situation in accordance with one embodiment of the invention. At step 300, a player selects card values one or more first player cards 50 and/or second player cards 52 using card selection device 30, next card device 32 and/or enter selection input device 34. The selected card values may correspond with cards that have been dealt in a live blackjack game in which the player is participating, such as at a casino or online, for example. For example, suppose the player is playing a physical blackjack hand and the original deal results in the player having a "2" card and a "6" card, and the dealer having a "5" card face-up. The player may use card selection device 30, next card device 32 and/or enter selection device 34 to enter a "2" card and a "6" card as first player cards 50 displayed in first display portion 12, and a "5" card as a face-up second player card 52 displayed in first second portion 14.

At step 302, the player presses "deal/advice" button 20 to request playing advice from apparatus 10 regarding the game situation submitted by the player at step 300. In response, at step 304, game management module 38 determines (a) which playing options are available to the player, and (b) the probabilities associated with each of such available playing options. In this particular embodiment, the probabilities associated with each of such available playing options comprise the average return per unit wager for each of the available playing options, as defined by table 100 shown in FIG. 2A. For example, since player's cards are a "2" and a "6" (for a total of 8) and the dealer's face-up card is a "5," game management module 38 may determine based on row 116 of table 100 (see FIG. 2A) that the playing options of "Hit," "Stand," and "Double," but not "Split" are available to the player.

Thus, at step 306, management module 38 may cause the display 56 associated with third button 16c to display the word "Double," thus indicating to the player that the "Double" option is available to the player via third button 16c. As shown in row 116 of table 100, the average return for the player if the player chooses to "Hit" would be +0.0708, the average return for the player if the player chooses to "Stand" would be −0.1672, and the average return for the player if the player chooses to "Double" would be +0.0035.

At step 308, game management module 38 may determine based on table 120 (see FIG. 2B) the appropriate advice indications to communicate to the player regarding each of the available playing options: "Hit," "Stand," and "Double." According to row 132 of table 120, in this situation the appropriate advice for the "Hit" option is a green light, the appropriate advice for the "Stand" option is a red light, and the appropriate advice for the "Double" option is a yellow light. In particular, the "Hit" option warrants a green light because it has the highest average return (+$0.0708) of the options available to the player. The "Double" option warrants a yellow light because its average return (+$0.0035) is within the relevant threshold (in this example embodiment, the threshold is $0.10) of the average return (+$0.0708) of the option having the highest average return (i.e., the "Hit" option). The "Stand" option warrants a red light because its average return (−$0.1672) is more than the threshold (0.10) less than the average return (+0.0708) of the option having the highest average return (i.e., the "Hit" option).

At step 310, the advice indications determined at step 308 are communicated to the player via advice indicators 18a, 18b and 18c associated with buttons 16a, 16b and 16c for the "Hit," "Stand," and "Double" playing options, respectively. In particular, advice indicator 18a lights up green, advice indicator 18b lights up red, and advice indicator 18c lights up yellow. The player may then use the advice communicated at step 310 in determining which playing option to initiate in the blackjack game that the player simulated at step 300. In addition, in some embodiments, the player may use apparatus 10 to obtain advice regarding additional situations during the same hand, such as after taking one or more hit cards, for example.

It should be understood that in alternative embodiments, the present invention contemplates using methods with additional steps, fewer steps, different steps, or steps in different sequential order so long as the steps remain appropriate for providing and managing a blackjack game.

It should be understood that in other embodiments, apparatus 10 may support one or more various other types of games, such as other types of card games, craps, roulette, poker, or a virtual slot machine, for example. In such embodiments, apparatus 10 may include various displays operable to display relevant data for such games and/or player interfaces operable to allow a player to make various selections, such as selecting from multiple available playing options. For example, apparatus 10 may be operable to (a) automatically determine, or receive from a player selections of, one or more game inputs regarding a game; (b) display to the first player the one or more game inputs; (c) automatically determine a probability associated with one or more available playing options based at least on a set of predetermined odds regarding the game and at least one of the one or more game inputs; and (d) automatically determine, based at least on the determined probability associated with the first playing option, whether to display a first indication corresponding with first advice regarding the first playing option, a second indication corresponding with second advice regarding the first playing option, or a third indication corresponding with third advice regarding the first playing option. Apparatus 10 may further include a plurality of option selection interfaces allowing the player to select from the plurality of playing options.

In addition, it should be understood that in other embodiments, the various functionalities provided by apparatus 10 may be alternatively provided via a computer network, such as via the Internet, for instance. In particular embodiments, game management module 38 may be hosted and/or maintained by a gaming system platform operable to be accessed by multiple players via a communications network such as the Internet. A player may access the gaming system via one or more web pages associated with the betting system platform. Advice regarding playing options that is generated by game management module 38 may be communicated to the player via such web pages. For example, a web page may indicate each playing option available to the player and indicate the advice determined for each of such available playing options in any suitable manner.

Although embodiments of the invention and their advantages are described in detail, a person skilled in the art could make various alterations, additions, and omissions without departing from the spirit and scope of the present invention as defined by the appended claims.

What is claimed is:

1. An apparatus comprising:
a memory;
a display device;
at least one processor to:
identify a first gameplay indicia assigned to a first player in a game;
identify a second gameplay indicia assigned to a second player in the game;
cause a first gameplay parameter assigned to the first player to be rendered on the display device;
cause a second gameplay parameter assigned to the second player to be rendered on the display device;
determine a probability associated with a first playing option based at least on a set of predetermined statistical data associated with the game, the first gameplay parameter and the second gameplay parameter; and
determine, based at least on the probability associated with the first playing option, whether to display a first indication corresponding with first advice regarding the first playing option.

2. The apparatus of claim 1, wherein the at least one processor is further configured to:
in response to determining that the probability falls within a first range, render on the display device a first indication corresponding with first advice regarding the first playing option;
in response to determining that the probability falls within a second range, render a second indication corresponding with second advice regarding the first playing option; and
in response to determining that the probability falls within a third range, render a third indication corresponding with third advice regarding the first playing option,
wherein:
a first range of probabilities corresponds with the first playing option being statistically advantageous for the first player;
a second range of probabilities corresponds with the first playing option being less statistically advantageous for the first player than the first range of probabilities; and
a third range of probabilities corresponds with the first playing option being less statistically advantageous for the first player than the second range of probabilities, and
wherein the first playing option is statistically advantageous for the first player such that the first playing option maximizes a likelihood that the first player wins the game and maximizes a potential return of the first player.

3. The apparatus of claim 1, wherein the first gameplay parameter assigned to the first player comprise a pair of face-up cards for the first player; and the second gameplay parameter assigned to the second player comprise a face-up card for the second player.

4. The apparatus of claim 1, wherein the first advice regarding the first playing option comprises advice for the first player to initiate the first playing option; a second advice regarding the first playing option comprises advice for the first player not to initiate the first playing option; and a third advice regarding the first playing option comprises advice that the first playing option is disadvantageous for the first player, but less disadvantageous than a predetermined threshold level, the first indication corresponding with the first advice comprises a first symbol, a second indication corresponding with the second advice comprises a second symbol and a third indication corresponding with the third advice comprises a third symbol.

5. The apparatus of claim 1, wherein the at least one processor is further configured to:
receive from the first player a selection of a playing option via one of a plurality of buttons associated a plurality of playing options;
wherein the plurality of buttons includes a first button corresponding to the first playing option;
wherein the first indication corresponding with the first advice comprises a light of a first color;
wherein a second indication corresponding with a second advice comprises a light of a second color;
wherein the an indication corresponding with a third advice comprises a light of a third color; and
wherein the light of the first color, the light of the second color, and the light of the third color are associated with the first button.

6. The apparatus of claim 1, wherein the at least one processor is further configured to:
determine for each of playing option an average return associated with that playing option; and
determine whether to display a first indication, a second indication, or a third indication based at least on the probability associated with the first playing option;
render a first indication in response to determining that the average return associated with the first playing option is the highest average return associated with any playing option;
render a second indication if the average return associated with the first playing option is less than a threshold amount less than that of the playing option having the highest average return; and
render a third indication if the determined average return associated with the first playing option is more than the threshold amount less than that of the playing option having the highest average return.

7. The apparatus of claim 1, wherein the at least one processor is further configured to:

allow the first player to select from a plurality of playing options;

receive from the first player a selection of a wager amount for the first gameplay parameter assigned to the first player;

receive from the first player a selection of the first playing option that is statistically disadvantageous for the first player, automatically render a message; and requesting the first player to confirm the selection of the first playing option if a selected wager amount exceeds a predetermined wager amount threshold.

8. The apparatus of claim 1, wherein the at least one processor is further configured to:

receive a wager associated with the one or more first gameplay parameters assigned to the first player, the wager having an associated wager amount;

determine a result of the one or more first gameplay parameters assigned to the first player;

determine a first player payout for a first hand based at least on the result of the one or more first gameplay parameters assigned to the first player and the wager amount associated with the first hand; and manage a balance for the first player based at least on the first player payout; and monitoring the increase or decrease of the balance for the first player over time.

9. A method, comprising:

identifying, by at least one processor, for a first player one or more first gameplay parameters assigned to the first player in a game;

identifying, by the at least one processor, for a second player one or more second gameplay parameters assigned to the second player in the game;

causing a first gameplay parameter assigned to the first player and a second gameplay parameter assigned to the second player to be rendered on a display device;

determining a probability associated with a first playing option based at least on a set of predetermined statistical blackjack data, the one or more first gameplay parameters assigned to the first player, and the one or more second gameplay parameters assigned to the second player; and determining, based at least on the probability associated with the first playing option, whether to display a first indication corresponding with first advice regarding the first playing option.

10. The method of claim 9, further comprising electronically determining one or more first player cards for the first player;

electronically determining one or more second player cards for the second player;

calculating an average return on a first hand of cards for the first player if the first player selects the first playing option; and calculating an average return per amount wagered by the first player on the first hand of cards.

11. The method of claim 9, further comprising:

receiving from the first player a selection of one of the plurality of playing options via one of a plurality of buttons associated the plurality of playing options;

displaying to the first player a mathematical progression of wagering information; and wherein the plurality of buttons includes a first button corresponding to the first playing option and the first indication corresponding with the first advice comprises a light of a first color.

12. The method of claim 9, wherein determining whether to display the first indication comprises in response to determining that the probability falls within a first range, displaying to the first player a first indication corresponding with first advice regarding the first playing option.

13. The method of claim 12, wherein:

a first range of probabilities corresponds with the first playing option being statistically advantageous for the first player;

a second range of probabilities corresponds with the first playing option being less advantageous for the first player than the first range of probabilities; and a third range of probabilities corresponds with the first playing option being less advantageous for the first player than the second range of probabilities.

14. The method of claim 13, wherein the first playing option is statistically advantageous for the first player such that the first playing option maximizes a likelihood of the first player winning the game and a potential return for the first player.

15. The method of claim 13, further comprising:

allowing the first player to select from the plurality of playing options;

receiving from the first player a selection of a wager amount for the game;

receiving from the first player a selection of the first playing option; and in response to receiving from the first player selection of the first playing option being statistically disadvantageous for the first player, automatically displaying to the first player a message requesting the first player to confirm the selection of the first playing option if the wager amount exceeds a predetermined wager amount threshold.

16. The method of claim 9, wherein:

the gameplay parameter assigned to the first player comprise a pair of face-up cards for the first player and the gameplay parameter assigned to the second player comprise a face-up card for the second player.

17. The method of claim 16, wherein the plurality of playing options further comprises at least one of:

a double-down playing option;

a split-pair playing option;

an insurance playing option; and a surrender playing option.

18. The method of claim 9, further comprising determining for each of the plurality of playing options an average return associated with that playing option; and determining whether to display a first indication, a second indication, or a third indication based at least on a determined probability associated with the first playing option;

determining to display a first indication if the determined average return associated with the first playing option is the highest average return associated with any of the plurality of playing options;

determining to display a second indication if the determined average return associated with the first playing option is less than a threshold amount less than that of the playing option having the highest average return; and determining to display a third indication if the determined average return associated with the first playing option is more than the threshold amount less than that of the playing option having the highest average return.

19. The method of claim 9, wherein:

the first advice regarding the first playing option comprises advice for the first player to initiate the first playing option;

a second advice regarding the first playing option comprises advice for the first player not to initiate the first playing option; and a third advice regarding the first playing option comprises advice that the first playing option is disadvantageous for the first player, but less disadvantageous than a predetermined threshold level.

\* \* \* \* \*